US008527354B2

(12) United States Patent
Elgar et al.

(10) Patent No.: US 8,527,354 B2
(45) Date of Patent: Sep. 3, 2013

(54) AFFINITY GROUP

(75) Inventors: Tom Elgar, London (GB); Adam Elgar, London (GB)

(73) Assignee: Serverside Group Limited, London (GB)

( * ) Notice: Subject to any disclaimer, the term of this patent is extended or adjusted under 35 U.S.C. 154(b) by 1662 days.

(21) Appl. No.: 11/891,250

(22) Filed: Aug. 8, 2007

(65) Prior Publication Data

US 2008/0037900 A1 Feb. 14, 2008

(30) Foreign Application Priority Data

Aug. 8, 2006 (GB) .................................. 0615735.8
Apr. 20, 2007 (GB) .................................. 0707716.7

(51) Int. Cl.
*G06Q 30/00* (2012.01)

(52) U.S. Cl.
USPC ...................................................... 705/26.1

(58) Field of Classification Search
USPC ...................................................... 705/26.1
See application file for complete search history.

(56) References Cited

U.S. PATENT DOCUMENTS

| | | | |
|---|---|---|---|
| 5,410,642 A | 4/1995 | Hakamatsuka et al. |
| 5,771,071 A | 6/1998 | Bradley et al. |
| 5,886,334 A | 3/1999 | D'Entremont et al. |
| 5,889,941 A | 3/1999 | Tushie et al. |
| 5,909,673 A | 6/1999 | Gregory |
| 6,167,382 A | 12/2000 | Sparks et al. |
| 6,328,209 B1 | 12/2001 | O'Boyle |
| 6,344,853 B1 | 2/2002 | Knight |
| 6,493,677 B1 | 12/2002 | von Rosen et al. |
| 6,845,365 B2 | 1/2005 | von Rosen et al. |
| 6,968,335 B2 | 11/2005 | Bayliss et al. |
| 7,016,869 B1 | 3/2006 | Haeberli |
| 7,103,230 B1 | 9/2006 | Jam et al. |
| 7,360,692 B2 | 4/2008 | Zellner et al. |
| 7,576,752 B1 | 8/2009 | Benson et al. |
| 2001/0051876 A1 | 12/2001 | Seigel et al. |
| 2002/0025085 A1 | 2/2002 | Gustafson et al. |
| 2002/0057454 A1 | 5/2002 | Ueda et al. |
| 2002/0059278 A1 | 5/2002 | Bailey et al. |

(Continued)

FOREIGN PATENT DOCUMENTS

| | | |
|---|---|---|
| DE | 10055649 A1 | 5/2002 |
| EP | 0412520 A2 | 2/1991 |

(Continued)

OTHER PUBLICATIONS

Claessens et al. "On the Security of Today's Online Electronic Banking Systems", Computers and Security (2002) pp. 257-269 vol. 21, No. 3.

(Continued)

*Primary Examiner* — Mila Airapetian
(74) *Attorney, Agent, or Firm* — McDermott Will & Emery LLP

(57) ABSTRACT

A method of creating an affinity group image for application to an affinity group transaction means, the method comprising: displaying at least one image for application to a transaction means associated with the affinity group; receiving instructions to manipulate an image selected from the at least one image; processing the selected image by applying the received manipulation instructions to the selected image to produces a personalized image; and saving the personalized image for selection by a member of the affinity group.

21 Claims, 10 Drawing Sheets

(56) References Cited

U.S. PATENT DOCUMENTS

| | | | |
|---|---|---|---|
| 2002/0062264 A1 | 5/2002 | Knight | |
| 2002/0067500 A1 | 6/2002 | Yokomizo et al. | |
| 2002/0078146 A1 | 6/2002 | Rhoads | |
| 2002/0095392 A1* | 7/2002 | Ferguson et al. | 706/10 |
| 2002/0152166 A1 | 10/2002 | Dutta et al. | |
| 2002/0175931 A1 | 11/2002 | Holtz et al. | |
| 2003/0069809 A1 | 4/2003 | von Rosen et al. | |
| 2004/0093527 A1 | 5/2004 | Pering et al. | |
| 2004/0099730 A1 | 5/2004 | Tuchler et al. | |
| 2004/0144472 A1 | 7/2004 | Cowie | |
| 2004/0160624 A1 | 8/2004 | Elgar et al. | |
| 2004/0254833 A1 | 12/2004 | Algiene | |
| 2005/0167487 A1 | 8/2005 | Conlon et al. | |
| 2005/0171823 A1* | 8/2005 | Eichstaedt et al. | 705/7 |
| 2006/0200533 A1 | 9/2006 | Holenstein et al. | |
| 2007/0075134 A1 | 4/2007 | Perlow et al. | |
| 2007/0102510 A1* | 5/2007 | Beemer et al. | 235/380 |
| 2007/0124373 A1* | 5/2007 | Chatterjee et al. | 709/204 |
| 2007/0156837 A1 | 7/2007 | Elgar et al. | |
| 2007/0185795 A1 | 8/2007 | Petrime et al. | |
| 2007/0215699 A1 | 9/2007 | Arego et al. | |
| 2007/0219809 A1 | 9/2007 | Peyton | |
| 2007/0267486 A1 | 11/2007 | Ferrara et al. | |
| 2008/0230616 A1 | 9/2008 | Elgar et al. | |
| 2008/0308636 A1 | 12/2008 | Lynch et al. | |
| 2009/0052736 A1 | 2/2009 | Kacker | |
| 2009/0293003 A1* | 11/2009 | Nykamp | 715/755 |
| 2010/0133346 A1* | 6/2010 | Zellner et al. | 235/487 |
| 2012/0101913 A1* | 4/2012 | Ferrara et al. | 705/26.5 |

FOREIGN PATENT DOCUMENTS

| | | |
|---|---|---|
| EP | 0860986 A2 | 8/1998 |
| EP | 0878956 A1 | 11/1998 |
| EP | 1602072 | 12/2005 |
| EP | 1847964 | 10/2007 |
| JP | 2000-190669 | 7/2000 |
| KR | 2002-0033704 A | 5/2002 |
| WO | WO 98/04988 | 2/1998 |
| WO | WO 01/77858 A2 | 10/2001 |
| WO | WO 02/39329 A2 | 5/2002 |
| WO | WO 02/067528 A2 | 8/2002 |
| WO | WO 03/085573 | 10/2003 |
| WO | WO 2004/074961 A2 | 9/2004 |
| WO | WO 2005/081128 A1 | 9/2005 |
| WO | WO 2006/018624 A1 | 2/2006 |
| WO | WO 2006/018636 A2 | 2/2006 |
| WO | WO2006018624 | 2/2006 |

OTHER PUBLICATIONS

Perfetti et al., "Macromedia Flash: A New Hope for Web Applications", User Interface Engineering, White Paper, (2002) pp. 1-17.

"Macromedia: Entwicklung von rich-Internet-Anwedungen mit Macromedia MX", Macromedia White Paper, Apr. 2002.

Dahm, "Search Engine Tip: Beware of Query Strings" Keynote NetMechanic, Webmaster Tips, vol. 2, No. 11, Dec. 1999, http://www.netmechanic.com/news/vol2/search_no11.htm.

Thomason, "Beginner Tip: Form Processing Basics" Keynote NetMechanic, Webmaster Tips, vol. 5, No. 19, Oct. 2002, http://www.netmechanic.com/news/vol5/beginner_no19.htm.

Sheriff, "Introduction to ASP.NET and Web Forms", msdn, .NET Development (General) Technical Articles, Nov. 2001, http://msdn.microsoft.com/en-us/library/ms973868(printer).aspx.

Kochhar, "InformIT: Posting HTML Form Data as XML Strings> Why XML?", informIT, Jun. 29, 2001, http://www.informit.com/articles/article.aspx?p=21906.

Kochhar, "Peachpit: Transforming HTML Form Data as XML Strings Using Java>A Refresher", Oct. 12, 2001, http://www.peachpit.com/articles/articles.aspx?p=23607.

"Flash->ASP->MS-Access: Please Help", Microsoft IIS Web Server and ASP.NET, Webmaster World.com, Jan. 25-31, 2002, http://www.webmasterworld.com/forum47/45.htm.

"Macromedia Fireworks 4—Using Fireworks and Flash Together: Importing PNG files with transparency", Adobe Systems Incorporated (2008) http://www.adobe.com/support/fireworks/programs/fw_to_flash/fw_to_flash05.html.

"Transparency Support in Flash" Adobe Systems Incorporated (2008) http://kb.adobe.com/selfservice/viewContent.do?externalId=tn_12804.

Gleason, "An Overview of the File Transfer Protocol" NcFIP Software (2001) http://www.ncftp.com/libncftp/doc/ftp_overview.html.

Vuong, "Home PC surfers accelerate use of high-speed connections", The Denver Post, Feb. 9, 2001.

Mitchell, "History of Networking—About Computer Networking History" About.com, printed May 15, 2008, http://compnetworking.about.com/od/basicnetworkingconcepts/1/aa021403a.htm.

"Global Napster Usage Plummets, but New File-Sharing Alternatives Gaining Ground, Reports Jupiter Media Metrix", Jupiter Media Metrix, Jul. 20, 2001, http://www.comscore.com/press/release.asp?id=249.

Affidavit of Tom Elgar in the Matter of the Opposition to the Grant of Indian Patent No. 230390, May 9, 2010.

Affidavit of Tom Elgar in the Matter of the Opposition to the Grant of Indian Patent No. 230390, Aug. 31, 2010.

Opposition Under Section 25(2) of the Indian Patent Act, 1970 Against Indian Patent No. 230390 (Formerly Application No. 3046/CHENP/2005 dated Nov. 17, 2005), Preliminary Submissions, Dr. Steve G. Belovich, Mar. 23, 2010.

Reply Evidence Under Rule 59 of the Indian Patent Rules, 2003 in the Opposition filed by Dimpledough Inc. against Indian Patent No. 230390, Jul. 30, 2010.

\* cited by examiner

AFFINITY GROUP

TECHNICAL FIELD

The present invention relates to affinity group schemes. In particular, the present invention relates to methods and computer apparatus for affinity group schemes.

BACKGROUND

An affinity group is a group such as a charity or an organisation which has a plurality of members. Examples of affinity groups are the National Trust, Cambridge University and New York University.

In such an affinity group scheme, it is desirable for an affinity group financial transaction card to be created. Members of the affinity group can then apply to receive the affinity group financial card which has a pre-designed affinity group card image thereon. For example, a member of the National Trust may apply for an National Trust credit card which has an image of one of the National Trust castles on it and/or the National Trust logo.

Affinity group financial transaction card schemes are desirable to affinity groups as the card issuer makes a payment to the affinity group for each affinity group member which applies for an affinity group card. The card issuer also pays a percentage of the spending accrued with each affinity group card to the affinity group. Furthermore, affinity group card schemes are desirable to the card issuer as the pre-designed affinity group card image motivates members of the affinity group to apply for a card, thus creating new clients for the card issuer.

Known affinity group schemes initially comprise a sales process driven by the card issuer to each affinity group. Once an affinity group has signed up to the scheme, an image must be created for the affinity group card. This involves a process of designing an affinity group image and then subsequently printing a number of cards having the affinity group image applied thereto.

The printed cards are required to be stored under very high security conditions in individually labelled boxes. In some cases sophisticated card delivery carousels are used, however, in most cases hundreds if not thousands of printed affinity group cards are stored in marked card holders.

The affinity group is then required to create its own marketing material, with help from the card issuer, inclusive of a financial card application form, for direct mailing to members of the affinity group.

If a member of the affinity group decides that he/she wants an affinity group card, then they are required to fill in the card issuers application form and post it to the card issuer. The card issuer then processes the application form and determines whether the member is eligible for a financial card. If the member is eligible, then the card issuer orders a pre-printed affinity group card having the affinity group image printed thereon, to be retrieved from the card holder and to be printed with the members details. Finally, the card is sent to the member.

A common problem associated with the known affinity group schemes is that the card issuers are only able to target the very largest affinity groups, for example large charities. This is because the logistical difficulties and onerous cost of setting up and delivering the affinity group card must be offset by considerable card volumes generated.

Additionally, the design and pre-printing of affinity group cards can be a lengthy process. Once designed the cards typically take between 8 to 12 weeks to be printed with the affinity group image. Furthermore, the direct mailing of the affinity group marketing material does not tend to have a high response rate, typically only 0.2% of the members approached apply for the affinity group card.

Embodiments of the present invention seek to provide an improved affinity group scheme.

SUMMARY

According to one embodiment of the invention there is provided a method of creating an affinity group image for application to an affinity group transaction means, the method comprising: displaying at least one image for application to a transaction means associated with the affinity group; receiving instructions to manipulate an image selected from the at least one image; processing the selected image by applying the received manipulation instructions to the selected image to produces a personalised image; and saving the personalised image for selection by a member of the affinity group.

According to one embodiment of the invention there is provided a method of operating a computer for creating an affinity group image for application to an affinity group transaction means, the method comprising: displaying at a user interface at least one image; providing an internet communications link coupling the user interface to an image processor; receiving at the image processor instructions to manipulate an image selected from the at least one image; causing the image processor to apply the received manipulation instructions to the selected image to produce an affinity group image; and saving in storage means the affinity group image for selection by a member of the affinity group.

According to another embodiment of the invention the method further comprises: associating an identifier to each affinity group image; and saving the affinity group image and associated identifier.

According to another embodiment of the invention the identifier comprises an affinity group image identifier and an affinity group identifier.

According to another embodiment of the invention the at least one image is uploaded from a users computer.

According to another embodiment of the invention the instructions to manipulate include rotating, resizing, moving, and adding text to the selected image.

According to another embodiment of the invention the affinity group image comprises one or more images overlaid with each other.

According to another embodiment of the invention the at least one image is a logo.

According to one embodiment of the invention there is provided a method of producing an affinity group transaction means, the method comprising: displaying at least one affinity group image; enabling only members of the affinity group to select one of the affinity group images; and applying the selected affinity group image to a transaction means.

According to one embodiment of the invention there is provided a method of operating a computer system for producing an affinity group transaction means, the method comprising: displaying at a user interface at least one affinity group image; providing an internet communications link coupling the user interface to an image processor; enabling only members of the affinity group to select one of the affinity group images; and causing the image processor to apply the selected affinity group image to a transaction means.

According to another embodiment of the invention the method further comprises: printing the transaction means having the selected affinity group image.

According to another embodiment of the invention the method further comprises: a storage means for storing the at least one affinity group image.

According to another embodiment of the invention the method further comprises: associating an identifier to the at least one affinity group image.

According to another embodiment of the invention the method further comprises: storing the at least one affinity group image and the associated identifier in a storage means.

According to another embodiment of the invention the identifier comprises an affinity group image identifier and an affinity group member identifier.

According to another embodiment of the invention an affinity group is a group comprising at least one member.

According to another embodiment of the invention the method further comprises: enabling a members of the affinity group to upload an image from their computer; processing the uploaded image by applying received manipulation instructions to the uploaded image to produce a personalised affinity group image; and applying the uploaded personalised image to the transaction means.

According to one embodiment of the invention there is provided a method of distributing credit accrued from an affinity group scheme, the method comprising: transferring credit to a scheme provider in respect of a member who joins an affinity group scheme; and transferring a percentage of the transferred credit from the scheme provider to an affinity group.

According to one embodiment of the invention there is provided a method of distributing credit accrued from an affinity group scheme, the method comprising: transferring credit to a scheme provider in respect of spending accrued from an affinity group transaction means; and transferring a percentage of the transferred credit from the scheme provider to an affinity group.

According to another embodiment of the invention the method further comprises: transferring credit to a scheme provider in respect of spending accrued from an affinity group transaction means; and transferring a percentage of the transferred credit from the scheme provider to an affinity group.

According to another embodiment of the invention the method further comprises: associating identifier data to the transferred credit; and determining which affinity group the percentage of transferred credit should be transferred to based on the identifier data.

According to one embodiment of the invention there is provided a method of printing a transaction means, the method comprising: receiving user data from a processor; receiving user image selection data from a processor; and printing a transaction means having the user data and the user image.

According to another embodiment of the invention the user image selection data is identification data; and further comprising requesting the user selected image from a storage means in accordance with the identification data.

According to one embodiment of the invention there is provided a process for automating the set up of an affinity group scheme, the process comprising: enabling an affinity group to apply through a user interface for an affinity group scheme; displaying at least one image; enabling manipulations of a selected one of the at least one image; storing the manipulated image in storage means; and making the stored image available for selection by a member of the affinity group for application to an affinity group transaction means.

According to another embodiment of the invention the process further comprises: enabling the affinity group to upload an image from an affinity group computer; storing the uploaded image in storage means; and enabling selection and manipulation of the uploaded image.

According to another embodiment of the invention the process further comprises: enabling manipulations of another selected one of the at least one image; storing the another manipulated image in the storage means; and making the stored images available for selection by a member of the affinity group for application to an affinity group transaction means.

According to another embodiment of the invention the process further comprises: creating an image identifier; associating the image identifier to the manipulated image; and storing the manipulated image and associated image identifier in the storage means.

According to another embodiment of the invention the at least one image and the manipulated image are stored in separate storage means.

According to another embodiment of the invention the at least one image and the manipulated image are stored in the same storage means.

According to another embodiment of the invention the image identifier comprises: a first identifier identifying the affinity group; and a second identifier identifying the manipulated image.

According to another embodiment of the invention the at least one image Is stored in a remote image store; a graphical representation of the selected one of the at least one image is displayed on a user interface; the user interface is coupled to a remote image processor by an internet communications link, said link being operable to transfer information about manipulations applied to the graphical representation between the user interface and the remote image processor; and the remote image processor accesses the remote image store in order to apply to the selected one of the at least one image held in the remote image store manipulations emulating those applied to the graphical representation.

According to another embodiment of the invention a scheme provider and/or a transaction means issuer checks the manipulated image.

According to one embodiment of the invention there is provided a method of applying for an affinity group transaction means, the method comprising: applying for an affinity group transaction means; and selecting an affinity group image for application to the affinity group transaction means.

According to one embodiment of the invention there is provided a method of applying for an affinity group transaction means, the method comprising: selecting an affinity group image for application to an affinity group transaction means; and applying for the affinity group transaction means.

According to another embodiment of the invention the method further comprises: printing the transaction means having the selected predetermined affinity group image thereon.

According to another embodiment of the invention the method further comprises: associating an image identifier to the affinity group image; and storing the image identifier and the affinity group image in storage means.

According to another embodiment of the invention the method further comprises: requesting the selected affinity group image from the storage means based on the image identifier; and printing the transaction means having the selected affinity group image thereon.

According to another embodiment of the invention the method further comprises: uploading an image from a personal computer; manipulating the uploaded image; and wherein the manipulated uploaded image is selected for application to the affinity group transaction means According to another embodiment of the invention the manipulated uploaded image also comprises an affinity group logo.

According to another embodiment of the invention the method further comprises: associating a user identifier to the selected predetermined affinity group image; and storing the user identifier in a storage means.

According to one embodiment of the invention there is provided a method of printing a transaction means, the method comprising: receiving a print request comprising an image identifier and a user identifier; accessing a first storage means to retrieve image data associated with the image identifier; accessing a second storage means to retrieve user data associated with the user identifier; and printing the transaction means comprising the retrieved user data and the retrieved image data.

According to another embodiment of the invention the print request comprises a plurality of print requests, each print request comprising an image identifier and a user identifier.

According to one embodiment of the invention there is provided a method of automating the set up of an affinity group scheme for issuing transaction cards, the method comprising: enabling an affinity group to apply through a user interface for an affinity group scheme; request the affinity group inputs affinity group data and/or at least one affinity group image; and automatically generating an affinity group website based on a template affinity group website and comprising the inputted affinity group data and/or image.

According to one embodiment of the invention there is provided a method of automating the set up of an affinity group scheme, the method comprising: enabling an affinity group to apply through a user interface for an affinity group scheme; request the affinity group inputs affinity group data and/or at least one affinity group image; and automatically generating an affinity group marketing material based on a template affinity group marketing material and comprising the inputted affinity group data and/or image.

According to another embodiment of the invention the at least one affinity group image is an affinity group logo.

According to one embodiment of the invention there is provided a method for distributing revenue generated from transaction means, the method comprising: transferring revenue generated in respect of an affinity group transaction means from the affinity group transaction means issuer to an affinity group scheme provider; and transferring a percentage of the revenue generated in respect of the affinity group transaction means from the affinity group scheme provider issuer to an affinity group.

According to another embodiment of the invention the method further comprises: associating an affinity group identifier with the revenue generated in respect of the affinity group transaction means; and transferring the affinity group identifier together with the revenue.

According to another embodiment of the invention the method further comprises: determining to which affinity group the revenue accrues based on the associated affinity group identifier.

According to another embodiment of the invention the identifier identifies the affinity group and the affinity group member to whom the transaction means belongs.

According to another embodiment of the invention a batch of revenue is transferred comprising revenue generated in respect of a plurality of affinity group transaction means.

According to another embodiment of the invention the plurality of affinity group transaction means all belong to the same affinity group.

According to another embodiment of the invention the plurality of affinity group transaction means do not belong to the same affinity group.

According to one embodiment of the invention there is provided a method for distributing revenue generated from transaction means, the method comprising: transferring a predetermined amount in accordance with each application for an affinity group transaction means from an affinity group transaction means issuer to an affinity group scheme provider; transferring a percentage of the predetermined amount from the affinity group scheme provider to the affinity group.

According to one embodiment of the invention there is provided a computer system for creating an affinity group image for application to an affinity group transaction means, the computer system comprising: a user interface for displaying at least one image; an internet communications link coupling the user interface to an image processor said link being operable to transfer instructions to manipulate an image selected from the at least one image between the user interface and the image processor; and means for causing the image processor to apply the received manipulation instructions to the selected image to produce an affinity group image; and for saving in storage means the affinity group image for selection by a member of the affinity group.

In particular, embodiments of the present invention seek to provide an automated process for setting up an affinity group scheme, including for example, automating the generation of marketing materials for the affinity group; using online techniques, such as email, to drive down the cost of soliciting the members once the scheme is in place; using digital card printing techniques to ensure that, while each affinity card group will have their own card stock, these do not have to be printed in advance and stored at high cost as they are printed only when required; and reducing the practical barriers and cost of creating an affinity group website through using WYSIWYG tools to design the site.

BRIEF DESCRIPTION OF THE DRAWINGS

For a better understanding of the present invention and as to how the same may be carried into effect reference will now be made, by way of example only, to the accompanying drawings, in which.

DETAILED DESCRIPTION

Additional advantages and novel features of the invention will be set forth in part in the description which follows, and in part will become apparent to those skilled in the art upon examination of the following and accompanying drawings or may be learned by practice of the invention.

Figure 1:
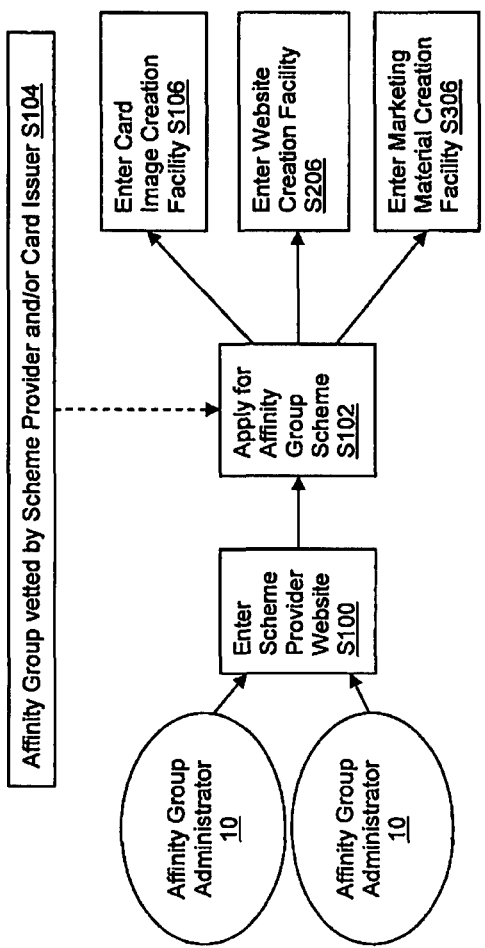
FIG. 1 illustrates a process of the present invention for applying for an affinity group scheme.

FIG. 1 illustrates a process of the present invention by which an affinity group administrator 10 can apply to set up an affinity group scheme.

As illustrated in FIG. 1, an affinity group administrator 10 enters the scheme providers website at step S100. In one embodiment, the scheme provider website provides information about the affinity group scheme and how it works. The affinity group administrator 10 then applies to set up an affinity group scheme at step S102. In order to apply for an affinity group scheme the affinity group administrator 10 may be requested to answer several predetermined questions about the affinity group. Based on the affinity group administrator's answers, the affinity group is vetted by the scheme provider and/or the card issuer at step S104 to determine if they are suitable for the affinity group scheme. In some instances it may not be necessary for the scheme provider and/or the card issuer to vet the affinity group.

If successful, the affinity group administrator 10 is then directed, either through a link which they need to activate, or automatically, to enter the scheme providers card image creation facility 12 at step S106, the scheme providers affinity group website creation facility 14 at step S206, or the scheme providers affinity group marketing material creation facility 16 at step S306. In a preferred embodiment, the affinity group administrator 10 enters each of these creation facilities 12, 14, 16 in order to create at least one affinity group card image, an affinity group website and affinity group marketing material. However, the affinity group administrator 10 is not required to enter all of these facilities 12, 14, 16. For example, the affinity group scheme would still function with the creation of at least one affinity group card image and an affinity group website, or at least one affinity group card image and affinity group marketing material.

Furthermore, the affinity group administrator 10 can enter these facilities 12, 14, 16 in any order, for example the affinity group administrator 10 may opt to enter the affinity group card image creation facility 12 first, followed by the affinity group website creation facility 14 and then the affinity group marketing material creation facility 14. Alternatively, the affinity group administrator 10 may opt to enter the affinity group website creation facility 14 first, followed by the affinity group marketing material creation facility 16 and then the affinity group card image creation facility 12. In addition, the affinity group administrator 10 can exit the process at any stage and return to finish the process at a later time or date.

If unsuccessful at step S104, the reason for the affinity group's rejection is sent to the affinity group administrator 10 and the affinity group administrator 10 is prohibited from continuing with the process.

Figure 2:
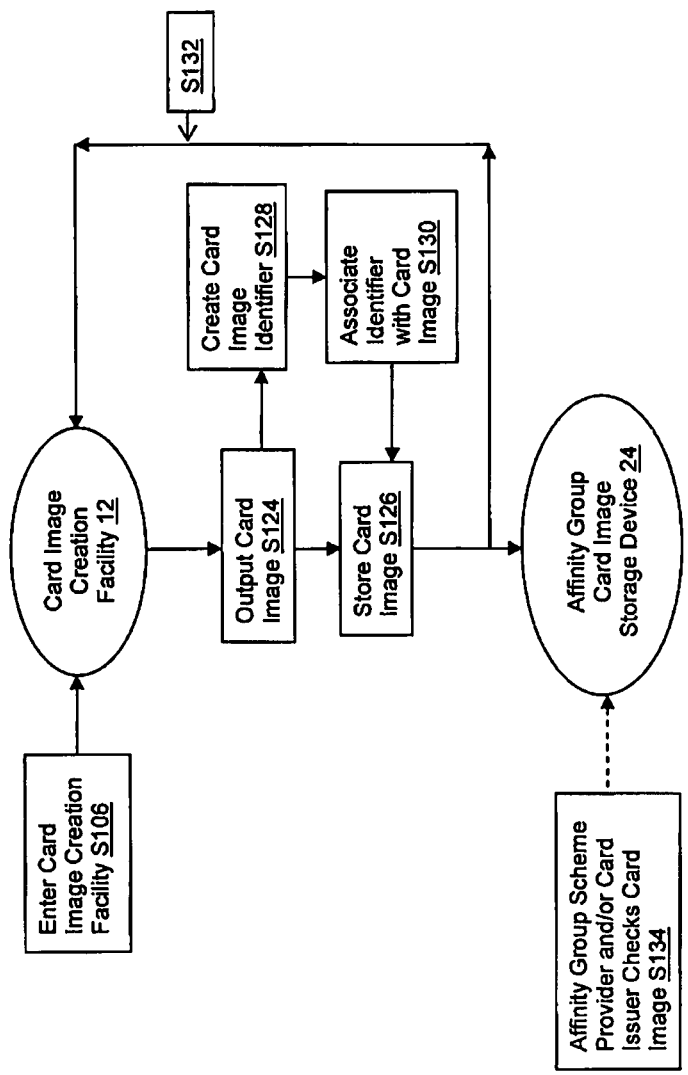
FIG. 2 illustrates a process of the present invention for creating an affinity group card image.

FIG. 2 illustrate a process of creating an affinity group card image. The affinity group administrator 10 enters the card image creation facility 12 at step S106, in order to design at least one affinity group card image. The card image can be made up from one or several components, each of which has its position defined relative to an origin, and can be manipulated based on a set of predetermined rules, such as, rules allowing the image or its components to be resized, rotated, flipped, mirrored and moved relative to other components and/or an origin. Once designed, the affinity group card image can be applied to affinity group financial cards which are associated with the affinity group.

Figure 3:
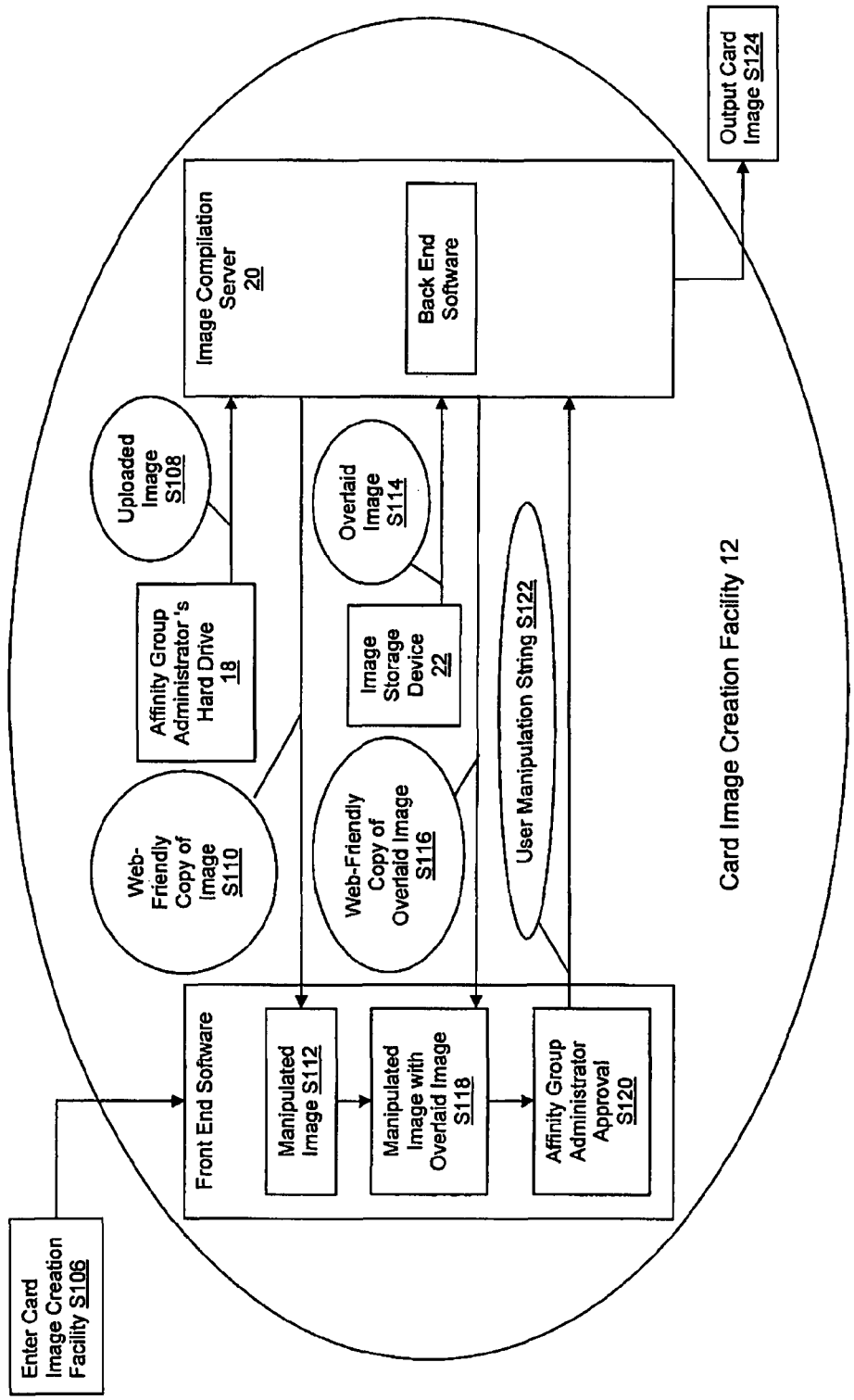
FIG. 3 illustrates a process of the present invention for creating and manipulating an image.

FIG. 3 illustrates in further detail a process of creating an affinity group card image using the card image creation facility 12. The card image creation facility 12 allows the affinity group administrator 10 to create a card image through a browser interface that is divided into two software portions, the front end software and the back end software. The affinity group administrator 10 enters the front end software of the card image creation facility 12, at step S106. The front end software may be operated by a website server or other front end server and operates entirely within an Internet browser. In most cases the front end software, which is a Graphical User Interface (GUI), is not required to be download, because it accepts the limitations of the browser.

The affinity group administrator 10 can opt to select and upload an image from their hard drive 18 at step S108 to the image compilation server 20. Uploaded images can include those affinity group members might naturally associate with the affinity group, such as castles owned by the National Trust, and/or affinity group logos. The uploaded affinity group images can only be accessed by the affinity group who uploaded them and cannot be accessed and/or used by any other affinity group. Alternatively, an image may be selected from scheme provider stock images stored in the image storage device 22.

Back end software, running on the image compilation server 20, enters the uploaded image into a storage device and generates a web-friendly graphical representation of the image at step S110 to send to the front end software. The web-friendly graphical representation is a less computationally demanding representation of the image.

The affinity group administrator 10 performs image manipulations at step S112, such as resizing, rotating, positioning, flipping, scaling, brightness controls, red-eye reduction, altering opacity levels, and placing the image as desired. Text can also be added to the image, such as the name of the affinity group. Furthermore, the affinity group administrator 10 can change the colour of the image, such that the image uses colours associated with the affinity group.

Next, the affinity group administrator 10 can select another image to overlay on top of the first image at step S114. The overlay image may, for example, also have been uploaded from the affinity group administrator hard drive 18 or may be selected from the stock images stored in the storage device 22. The back end software transmits a web-friendly graphical representation of the overlay image at step S116 to the affinity group administrator 10, for use in creating a combination of the original manipulated image with the overlay image at step S118.

The number of images combined in a card image is not limited to one or two, many more layers may be used if desired.

Following completion of the affinity group card image, the affinity group administrator 10 approves the card image at step S120 and the front end software transmits a string of affinity group administrator manipulation data to the image compilation server 20 at step S122. This string encapsulates the affinity group administrator's 10 image selections and manipulations.

On receiving this string the back end software accesses the original copies of the images from the image storage device and performs the exact operations that the affinity group administrator 10 has chosen in the front end software for the affinity group card image. In this way, the back end software emulates the manipulations at the affinity group administrator end according to the information transferred in the text string. At this point the back end software outputs the resulting card image at step S124.

In a preferred embodiment, the string of affinity group administrator manipulation data is sent after the manipulation is completed, and takes the form of a text string for each component of the image. For example, the text string make-image.aspx for a graphics component might read:

id+=030,x=182,y=32.3,flip=yes,rotate=270, scale=190.6, where id is an image identifier; x and y define the position of a component relative to a predetermined origin; and flip, rotate, and scale define manipulations of types generally well known in the art. Those of skill in the art will appreciate that a range of image manipulations can be defined in this way. A resulting image may be represented by one or a number of graphical components. It is thus possible for a plurality of text strings, or an extended text string, to define an image made of a plurality of separate graphical components. The graphical components used, for example, are generated and manipulated with a minimum of computing resources; and the card images constructed as a result can be recreated on the image compilation server 20 using the relevant (and generally much larger) image files.

Returning to FIG. 2, following creation of the affinity group card image, the card image is output at step S124 and stored in the card image storage device 24 at step S126. In one embodiment, a card image identifier may be created at step S128 and associated with the card image at step S130 in the storage device 24.

The card image identifier can be used to identify each affinity group card image. In addition, the card image identifier may comprise data in order to identify which affinity group the card image belongs to.

Following creation of the card image, the affinity group administrator 10 can either elect to exit the image creation facility 12, or can elect to create a further affinity group card image at step S132, such that several different affinity group card images are stored in the storage device 24.

In one embodiment, the scheme provider and/or card issuer can review all affinity group card images at step S134 to determine whether the card image is acceptable. If the card image is not acceptable, then the reason for the card image's rejection is sent to the affinity group administrator 10 and the affinity group administrator 10 is invited to redesign the card image.

In one embodiment, the card image displayed on a financial card may be restricted to a selected pre-defined area, such as a "window" on the financial card (or other transaction cards), leaving the rest of the card free to contain functional features of the card, such as a bank logo, a payment card hologram type indicator (such as, for example, "Visa" or "Mastercard" logos).

Although the image creation facility 12 is discussed in detail above with reference to FIG. 3, the present invention is not limited to the use of the image creation facility of FIG. 3. For example, any known image creation facility could be used, such that the affinity group administrator 10 can manipulate images in order to create an affinity group card image.

Figure 4:
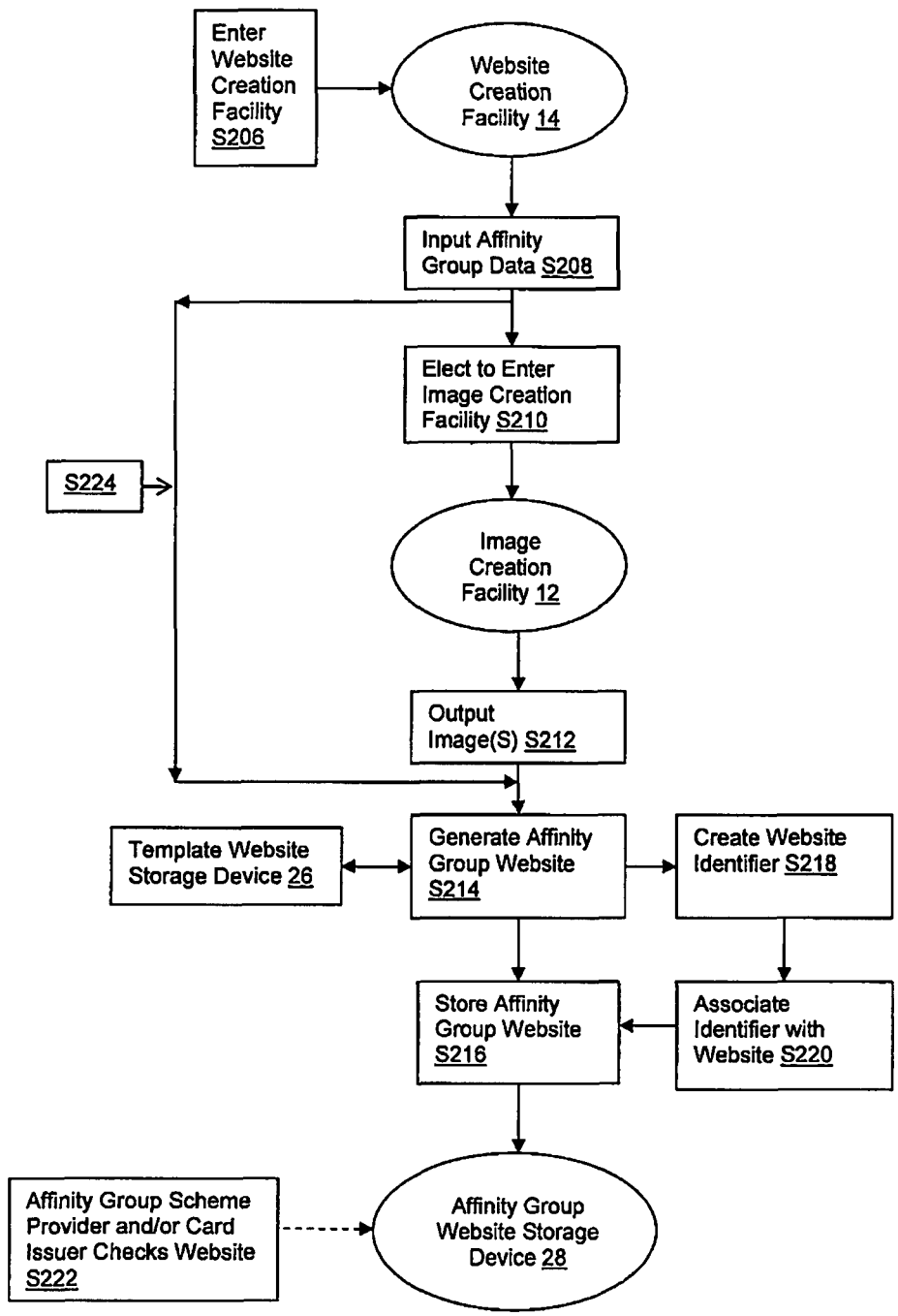
FIG. 4 illustrates a process of the present invention for creating an affinity group website.

FIG. 4 illustrates a process of creating an affinity group website. The affinity group administrator 10 is prompted to enter the website creation facility 14 at step S206.

The affinity group administrator 10 is then directed by the website creation facility 14 to input specific affinity group data at step S208 which can be used by the website creation facility 14 to automatically generate an affinity group website. The predefined data may be data such as the affinity group name; the affinity group mission statement etc.

The affinity group administrator 10 can also elect, either before or after the affinity group data has been inputted at step S208, to incorporate images in the affinity group website. If the affinity group administrator 10 decides to incorporate images in the affinity group website, they elect to enter the image creation facility 12 at step S210. The image creation facility 12 illustrated in FIG. 4 is the same as the image creation facility 12 illustrated in FIG. 3.

The affinity group administrator 10 can then select one or more images from their hard drive 18 or the stock images from the image storage device 22 for manipulation prior to use in the affinity group website. In addition, if the affinity group administrator 10 has already designed at least one affinity group card image and/or affinity group marketing material, then the affinity group administrator 10 can access the affinity group images previously uploaded and stored in the image compilation server 20. The image creation facility 12 outputs the final selected and manipulated images at step S212.

Following selection and manipulation of at least one image, the website creation facility generates the affinity group website at step S214 using a template website stored in the template website storage device 26, the selected and manipulated image(s) and the inputted data. For example, the template website may be a pre-designed website comprising blank spaces which are to be filled by specific predetermined data/images such as the affinity group name, the affinity group mission statement, the affinity group logo and the affinity group image. Upon generation, the inputted data and images are inserted into the appropriate blank areas of the template website to create an affinity group website.

Alternatively, if the affinity group administrator 10 elects not to incorporate images in the affinity group website at step S224, then the website creation facility generates the affinity group website at step S214 using a template website stored in the template website storage device 26 and the data inputted at step S208.

The affinity group website is then stored at step S216 in an affinity group website storage device 28. Although the affinity group website storage device 28 is illustrated as a separate storage device to the template website storage device 26, the storage devices 26 and 28 may be the same storage device.

In one embodiment, an affinity group website identifier is created at step S218 and associated with the generated affinity group website in the storage device 28 at step S220. This identifier is used to identify the affinity group website. The affinity group website identifier may also be used to identify the affinity group which the affinity group website belongs to.

In another embodiment, the scheme provider and/or card issuer can check the contents and appearance of the affinity group website at step S222 in order to determine whether the website is of a sufficient standard. If the website is not acceptable, then the reason for the website's rejection is sent to the affinity group administrator 10 and the affinity group administrator 10 is invited to redesign the website.

In a further embodiment, the affinity group administrator 10 is able to view and edit the generated affinity group website in order to approve the final website or alter the information displayed as required. Furthermore, the template website may be configurable by the affinity group administrator 10, such that the affinity group administrator 10 may be able to adjust certain features of the template website.

Although only one template website is describe, there may be several different template websites stored in the template website storage device 26. The affinity group administrator 10 can then select one of the template websites and this template website is retrieved from the template website storage device 26 for application of the input website data and images.

Once generated the affinity group website can be used by the affinity group in order to advertise the affinity group card to its members. The affinity group website can also be used to enable a member of the affinity group to apply for an affinity group card.

Alternatively, the data which is input by the affinity group can be used by the scheme provider to automatically generate an affinity group scheme web page which can be incorporated into an affinity groups existing website. In another embodiment, the affinity group scheme web page could be displayed on the scheme providers website.

The affinity group website may also contain specific text inserted by the card issuer, such as the terms and conditions of the financial transaction card. If the affinity group administrator 10 desires to change these, then any changes can be reviewed by the card issuer and the scheme provider prior to implementation of the changes. In addition, some portions of the template website may not be customizable by the affinity group and may only be changeable by either the scheme provider, card issuer or both.

Figure 5:
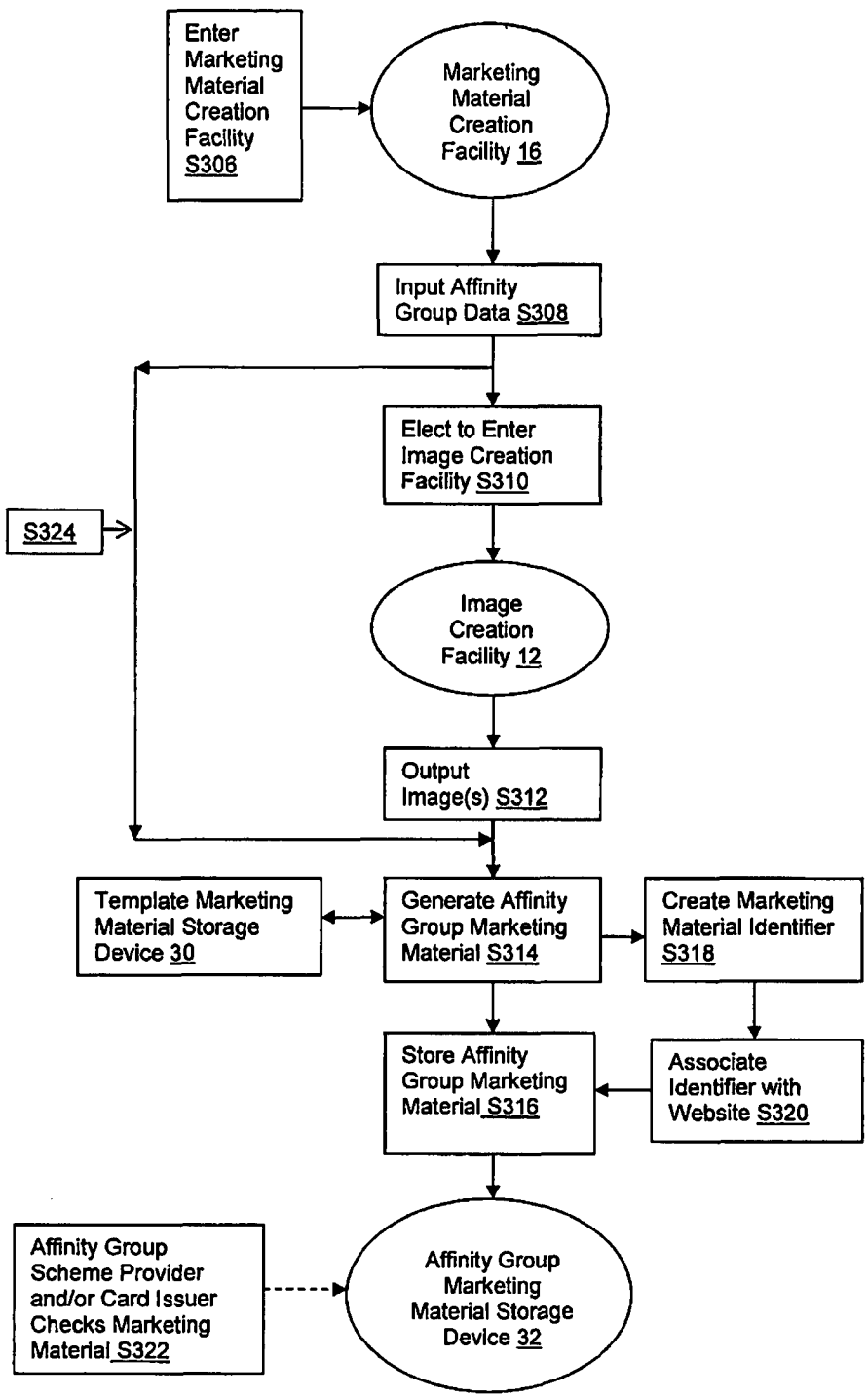
FIG. 5 illustrates a process of the present invention for creating affinity group marketing material.

FIG. 5 illustrates a process for creating affinity group marketing material. An affinity group administrator 10 is directed at step S306 to enter the scheme providers marketing material creation facility 16.

The affinity group administrator 10 is then directed by the marketing material creation facility 16 to input specific affinity group data at step S308. The requested data may be the same or different data to that requested by the website creation facility 14. In an alternative embodiment, the marketing material creation facility 16 may use the same data as that inputted to the website creation facility 14 and vice versa therefore the affinity group administrator 10 is not request to input this data twice. However, the affinity group administrator 10 may be presented with an option to insert further or different data, if required, at step S308.

The affinity group administrator 10 can also elect at step S310, either before or after the affinity group data has been inputted, to incorporate images in the affinity group marketing material. If the affinity group administrator 10 decides to incorporate images in the affinity group marketing material, they must enter the image creation facility 12. The image creation facility 12 illustrated in FIG. 5 is the same as the image creation facility 12 illustrated in FIG. 3.

The affinity group administrator 10 can access the affinity group images previously uploaded and stored in the image compilation server 20.

The affinity group administrator 10 can then select one or more images from their hard drive 18 or the stock images from the image storage device 22 for manipulation prior to use in the affinity group marketing material. In addition, if the affinity group administrator 10 has already designed at least one affinity group card image and/or affinity group website, then the affinity group administrator 10 can access the affinity group images previously uploaded and stored in the image compilation server 20. The image creation facility 12 outputs the final selected and manipulated images at step S312.

Following selection and manipulation of at least one image, the marketing material creation facility 16 generates the affinity group marketing material at step S314 using template marketing material stored in the template marketing material storage device 30, the selected and manipulated image(s) and the inputted data. For example, the template marketing material may be pre-designed marketing material comprising blank spaces which are to be filled by specific predetermined data/images such as the affinity group name, the affinity group mission statement, the affinity group logo and the affinity group image. Upon generation, the inputted data and images are inserted into the appropriate blank areas of the template marketing material to create the affinity group marketing material.

Alternatively, if the affinity group administrator 10 elects not to incorporate images in the affinity group marketing material at step S324, then the marketing material creation facility generates the affinity group marketing material at step S314 using template marketing material stored in the template marketing material storage device 30 and the data inputted at step S308.

The affinity group marketing material is then stored at step S316 in an affinity group marketing material storage device 32, which may be the same or a different storage device to that used to store the template marketing material.

Affinity group images which have been previously uploaded and manipulated can also be used in the affinity group marketing material and it may not be necessary for the affinity group administrator 10 to enter the image creation facility 12. In one embodiment, the affinity group administrator 10 merely needs to indicate that the same image(s) used in the affinity group website are to be used in the affinity group marketing material.

Alternatively, if the affinity group marketing material is designed prior to the affinity group website, then the affinity group administrator 10 merely needs to indicate that the same data/images used in the affinity group website are to be used in the affinity group marketing material.

In one embodiment, an affinity group marketing material identifier can be created at step S318 and associated with each generated affinity group marketing material in the memory 32 at step S320. The marketing material identifier can be used to identify the affinity group marketing material. In addition, the marketing material identifier can also be used to identify which affinity group the affinity group marketing material belongs to.

In another embodiment, the scheme provider and/or card issuer can check the contents and appearance of the generated affinity group marketing material at step S322 in order to determine whether all marketing material is of sufficient standard. If the marketing material is not acceptable, then the reason for the marketing materials rejection is sent to the affinity group administrator 10 and the affinity group administrator 10 is invited to redesign the marketing material.

The generated affinity group marketing material can then be distributed to members of the affinity group, such as via email, in order to encourage members of the affinity group to apply for an affinity group card. In one embodiment the affinity group email contains a link directly to the affinity group website.

In one embodiment, the affinity group administrator 10 is able to view and edit the generated affinity group marketing material in order to approve the final marketing material or alter the information displayed as required. Furthermore, the template marketing material may be configurable by the affinity group administrator 10, such as the affinity group administrator 10 may be able to move certain features of the template marketing material.

The automatically generated marketing material may include a PDF displaying the affinity group name, logo and a selection of affinity group card images from which a member of the affinity group can select.

If an affinity group member decides to apply for an affinity group financial card, then they can apply for the affinity group card online, offline or over the internet. The affinity group member may decide to apply for the affinity group financial card in response to the affinity group marketing material. In another embodiment, an affinity group member may go directly to the affinity group website in order to apply for the card, without having received the affinity group marketing material. In another embodiment, an affinity group member may go to the scheme providers website which then redirects the member to the appropriate affinity group website or the appropriate affinity group web page of the scheme providers website.

Figure 6:
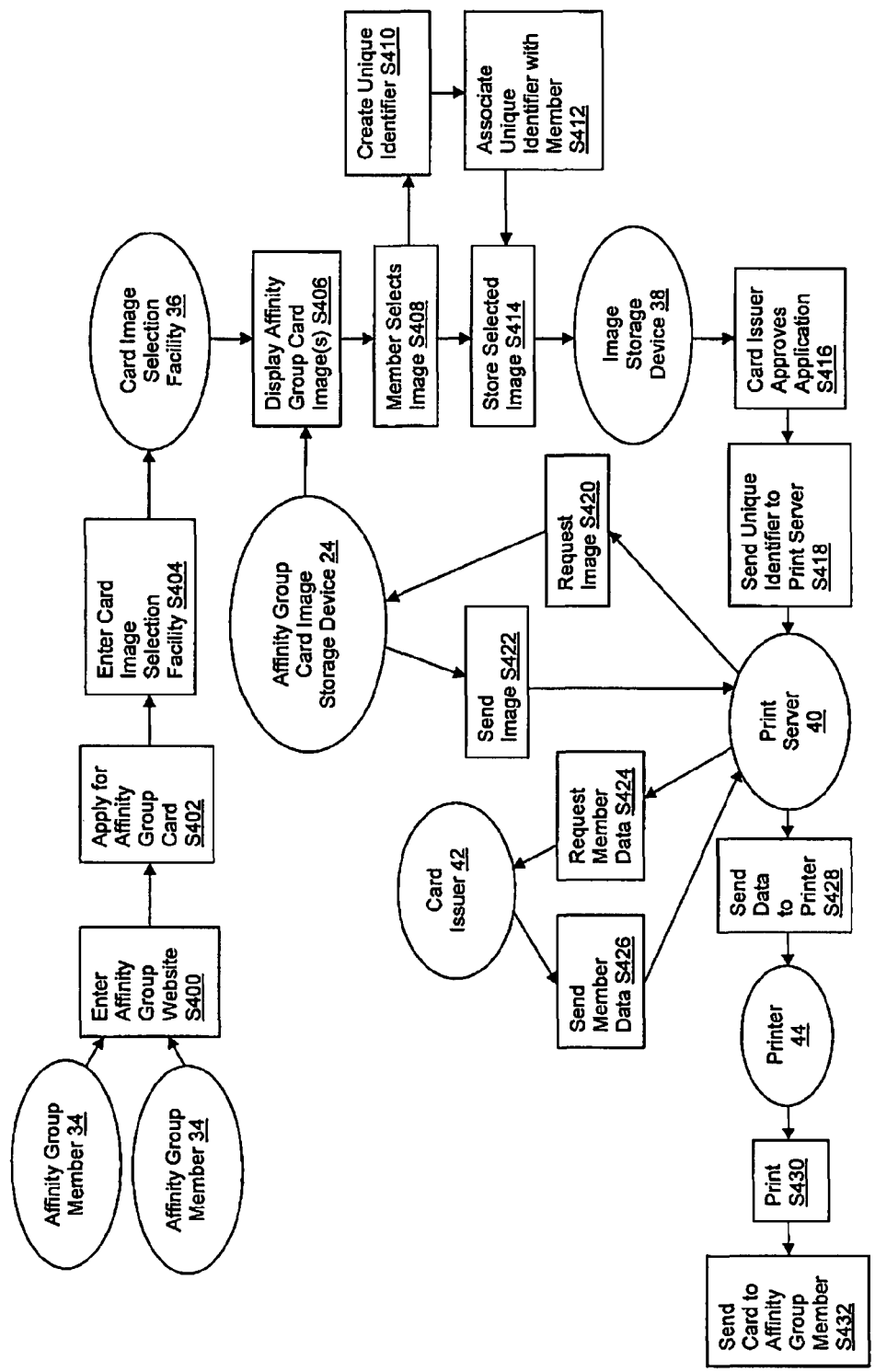
FIG. 6 illustrates a process of the present invention for applying for an affinity group financial card.

FIG. 6 illustrates a process of the present invention by which an affinity group member 32 can apply for an affinity group financial card. At step S400, an affinity group member 34 enters the affinity group website or web page. The affinity group member 34 then applies for the affinity group card at step S402. Following application, the affinity group member 34 is directed to enter the card image selection facility 36 at step S404. The card image selection facility 36 displays all the pre-designed affinity group card images at step S406, designed by the affinity group administrator 10 for the relevant affinity group to which the member 34 belongs. The pre-designed affinity group card images are stored in storage device 24. The affinity group member 34 selects one of the pre-designed affinity group card images for their financial card at step S408.

In one embodiment, an unique identifier is created at step S410 and is associated with the affinity group member at step S412. The unique identifier may then be associated with the selected card image and both are stored in the storage device 38 at step S414.

In another embodiment, the unique identifier comprises an affinity group member identifier and a selected card image identifier, and is stored in the storage device 38 instead of the selected card image, thereby reducing the amount of storage required in the storage device 38.

The card issuer must approve the application at step S416. For example, an affinity group member who has a bad credit rating may not be approved and therefore would not be issued with an affinity group financial card. Once the affinity group members application has been approved at step S416, the unique identifier is sent to the print server 40 at step S418.

If the unique identifier comprises the affinity group member identifier and the selected card image identifier, then upon receipt of the unique identifier, the print server 40 sends a request for the selected affinity group card image to the storage device 24 at step S420 based on the selected card image identifier. The storage device 24 then sends the affinity group card image, which relates to the card image identifier, to the print server 40 at step S422.

Furthermore, the print server 40 sends a request for member data to the card issuer 42 at step S424 based on the affinity group member identifier. The card issuer 42 sends the member's data to the print server 40 at step S426. Consequently, the financial data corresponding to the affinity group member identifier is obtained, via a secure connection to the card issuer 42 and at no time does the scheme provider server have any financial information.

The print sever 40 then sends the member data and the affinity group card image to the printer 44 at step S428. The printer 44 prints the financial card having the selected affinity group card image onto blank card stock, encodes the card's magnetic strip with the members financial data and embosses the card to create a finished affinity group financial card at step S430. Finally, the printed personalised financial card is sent to the member at step S432.

Alternatively, if the unique identifier comprises only the member data, and is associated with the selected card image, then following approval of the member by the card issuer at step S416, the card image and the unique identifier are sent to the print server 40 at step S416. Consequently, the print server 40 does not need to request the affinity group card image from the storage device 24 and the process moves directly from step S418 to step S424.

The member identifier may be a unique non-sequential identifier, which matches with a set of financial records, from the card issuer 42. Thus, in a "mail merge" type operation, the member's selected affinity group card image can be matched up with the member's financial and personal records, so that the correct image is placed on the affinity group card.

Figure 7:
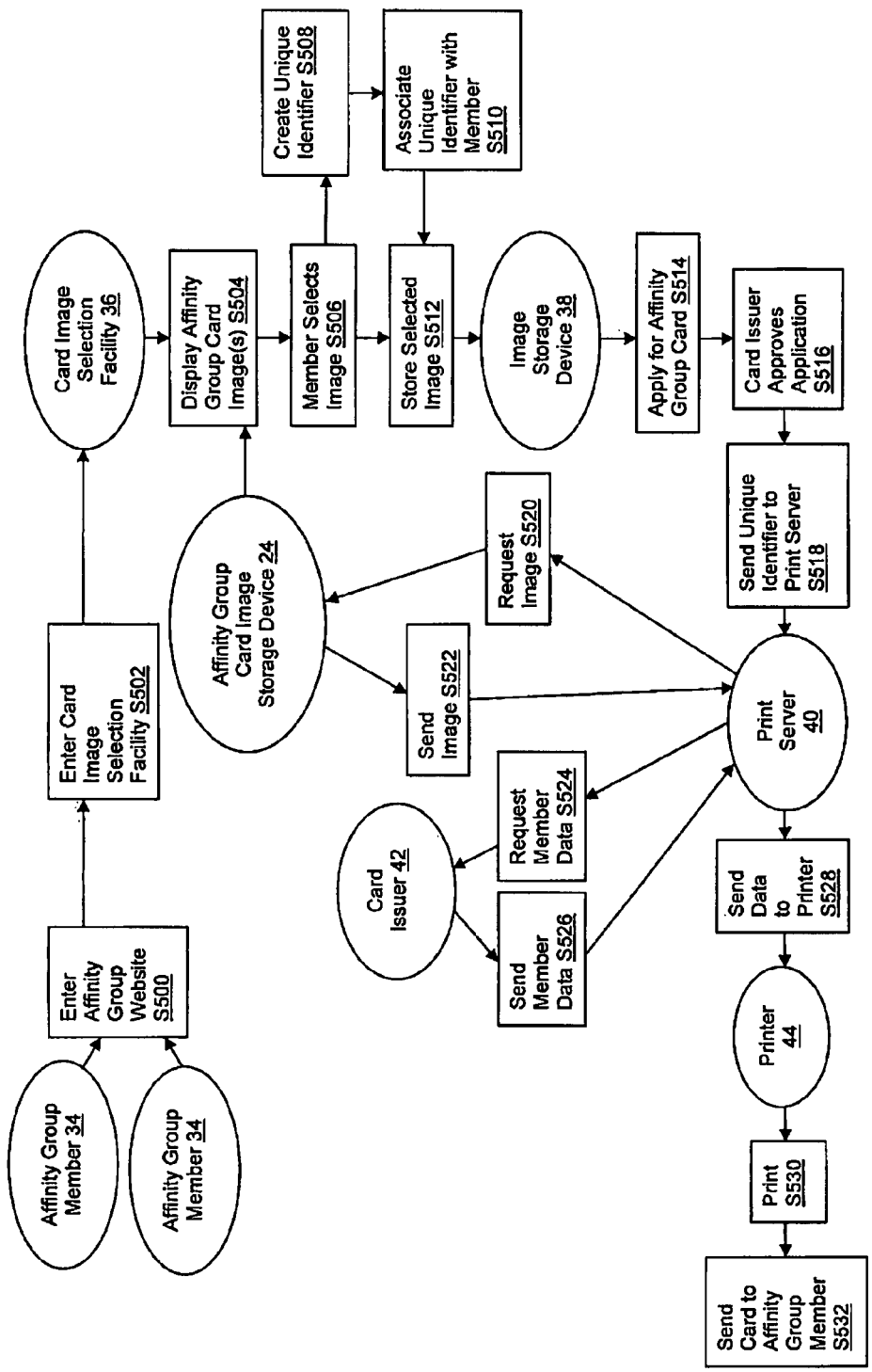
FIG. 7 illustrates another process of the present invention for applying for an affinity group financial card.

FIG. 7 illustrates an alternative process by which an affinity group member can apply for an affinity group financial card. At step S500, an affinity group member 34 enters the affinity group website or web page. The affinity group member 34 is then directed to enter the card image selection facility 36 at step S502. The card image selection facility 36 displays all the pre-designed affinity group card images at step S504, designed by the affinity group administrator 10 for the relevant affinity group to which the member 34 belongs. The pre-designed affinity group card images are stored in storage device 24. The affinity group member 34 selects one of the pre-designed affinity group card images for their financial card at step S506.

In one embodiment, an unique identifier is created at step S508 and is associated with the affinity group member at step S510. The unique identifier may then be associated with the selected card image and both are stored in the storage device 36 at step S512.

In a preferred embodiment, the unique identifier comprises an affinity group member identifier and a selected card image identifier, and is stored in the storage device 38, instead of the card image thereby reducing the amount of storage required in the storage device 38.

The affinity group member 34 then applies for the affinity group card at step S514. Following application, the card issuer must approve the application at step S516. For example an affinity group member who has a bad credit rating may not be approved and therefore would not be issued with an affinity group financial card. Once the affinity group member 34 has been approved at step S516, the unique identifier is sent to the print server 40 at step S518.

If the unique identifier comprises the affinity group member identifier and the selected card image identifier, then upon receipt of the unique identifier, the print server 40 sends a request for the selected affinity group card image to the storage device 24 at step S520 based on the selected card image identifier. The storage device 24 sends the requested affinity group card image to the print server 40 at step S522.

Furthermore, the print server 40 sends a request for member data to the card issuer 42 at step S524 based on the affinity group member identifier. The card issuer 42 sends the member's data to the print server 40 at step S526. The financial data corresponding to the affinity group member identifier is obtained, via a secure connection to the card issuer 42 and at no time does the scheme provider server have any financial information.

The print sever 40 then sends the member data and the affinity group card image to the printer 44 at step S528. The printer 44 prints the financial card having the selected affinity group card image onto blank card stock, encodes the card's magnetic strip with the members financial data and embosses the card to create a finished affinity group financial card at step S530. Finally, the printed personalised financial card is sent to the member at step S532.

Alternatively, if the unique identifier comprises only the member data, and is associated with the selected card image, rather than a selected card image identifier at step S512, then following approval of the member by the card issuer at step S516, the card image and the unique identifier are sent to the print server 40 at step S518. Consequently, the print server 38 does not need to request the affinity group card image from the storage device 18 and the process moves directly from step S518 to step S524.

In a further embodiment, the unique identifier comprises an affinity group member identifier, a selected card image identifier and an affinity group identifier so that it is known which affinity group the member belongs to.

In a preferred embodiment, the affinity group member applies for a financial card by completing an application form online, offline or over the internet However, other methods of completing the application form are possible. For example, the member may be required to print off the application form and send it to the card issuer following completion, or may be sent a paper application form directly upon request.

In addition, although the process of FIGS. 6 and 7 refer to the affinity group member 34 entering the affinity group website, it may be possible for the affinity group member 34 to apply for an affinity group card through different means, such as via a paper application form.

In a further alternative embodiment, the member can upload their own image for application to the affinity group card. For example, the member may wish to display a picture of their child on their affinity group card, but may also wish it to have the affinity group logo and/or name displayed on the card so that it is still an affinity group card. The member can manipulate their own picture, using the image creation facility 12 illustrated in FIG. 3.

The printer 44 uses digital card printing technology in order to print each card separately, each card is printed with the selected affinity group card image and the members data at the same time. Therefore, only one printing step is required. It is not necessary for affinity group cards to be pre-printed with the affinity group image and stored in high security establishments, prior to application of the affinity group members data.

Each affinity group card may be printed separately on demand, upon approval of each application form. Alternatively, a plurality of cards may be sent in a batch to the print server 40 for printing. Each card may have a different or the same affinity group image and may originate from the same or different affinity groups.

Figure 8:
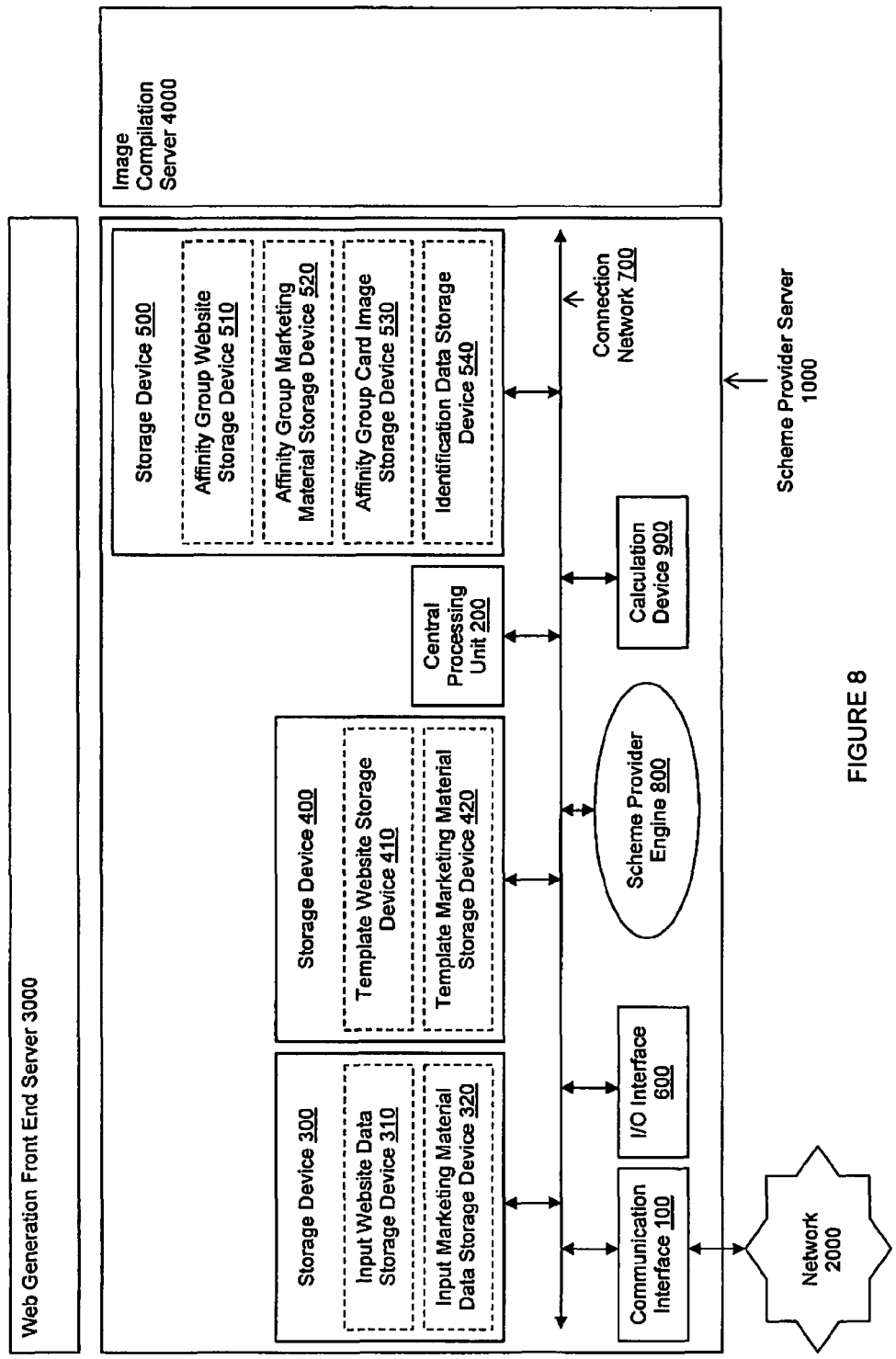
FIG. 8 illustrates a computing device for carrying out the processes of the present invention.

FIG. 8 illustrates an exemplary computing device 1000 such as a scheme provider server, which is used to perform the above mentioned processes.

The computing device 1000 comprises a communication interface 100, a central processing unit 200, storage devices 300, 400 and 500, an input/output interface 600, a scheme provider engine 800 and calculation device 900 operatively coupled by a connection network 700, illustrated in FIG. 8. The connection network 700 may be an electrical bus, an optical network, switch fabric or any other suitable interconnection system.

Figure 9:
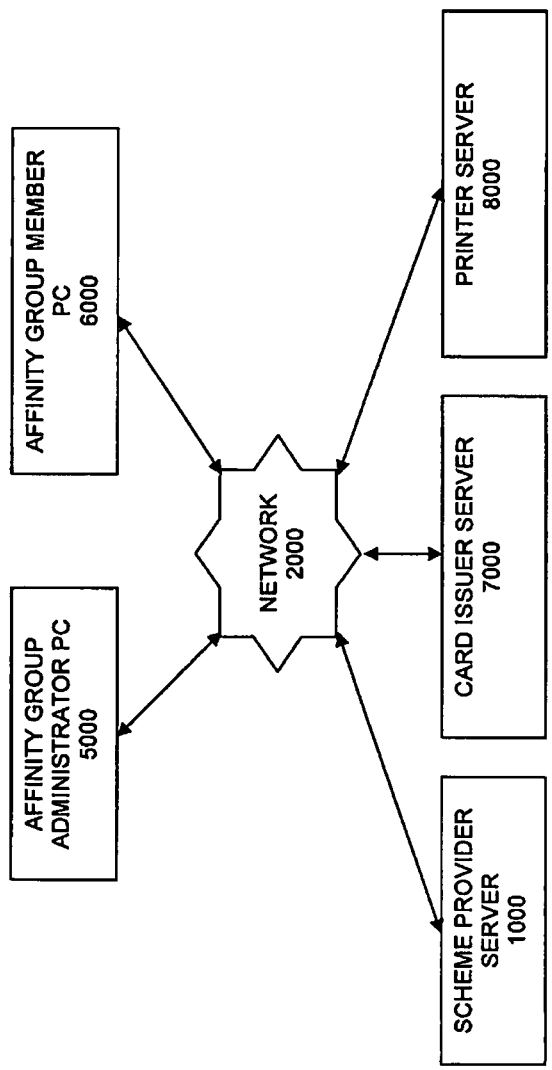
FIG. 9 illustrates connection of several computing devices of the present invention.

The scheme provider server 1000 is connected over a network 2000 to at least one an affinity group administrators personal computer 5000 and/or an affinity group members personal computer 6000, as illustrated in FIG. 9. The network 2000 may be for example the internet.

The central processing unit 200 controls the scheme provider server 1000 and may be a conventional microprocessor.

The storage device 300 is a temporary storage device and comprises an input website data storage device 310 and an input marketing material data storage device 320. The storage device 400 comprises a template website storage device 410 and a template marketing material storage device 420. The storage device 500 comprises an affinity group website storage device 510, an affinity group marketing material storage device 520, an affinity group card image storage device 530, and an identification data storage device 540. Although the storage devices 300 to 500 are illustrated as separate storage devices, one storage device may be used to store all the data.

The temporary storage device 300 maybe, for example one or more conventional random access memory (RAM) devices, Flash memory devices, and/or electrically erasable programmable read only memory (EEPROM) devices. Furthermore, although the storage device 300 are described as temporary storage devices, the storage device 300 could be a permanent storage device.

The communications interface 100 provides bidirectional data communication coupling for the scheme provider server 1000. The communication interface 100 can be functionally coupled to the network 2000. In one embodiment, the communications interface 100 provides one or more input/output ports for receiving electrical, radio frequency, or optical signals and converts signals received on the port(s) to a format suitable for transmission on the connection network 700. The communications interface 100 can include a radio frequency modem and other logic associated with sending and receiving wireless or wireline communications. For example the communications interface 100 can provide an EtherNet interface, Bluetooth and/or wireless capability for the computing device 1000.

Operation of the scheme provider server 1000 will now be described with reference to the process illustrated in FIGS. 1 and 2. When the affinity group administrator 10 enters the scheme provider website at step S100 and applies for an affinity group scheme, the affinity group administrators computer is able to communicate with the scheme provider sever 1000 via the network 2000.

The affinity group administrator 10 elects to enter the card image creation facility 12. At this point the scheme provider engine 800 hands operation over to the image compilation server 4000. The image compilation server 4000 carries out the same operations as the image compilation server 20 described above with reference to FIG. 3. Following creation of at least one card image, the image compilation server 4000 hands operation back to the scheme provider engine 800. The scheme provider engine 800 instructs the CPU 200 to store the at least one card image output by the image compilation server 4000 in the affinity group card image storage device 530 (affinity group card image storage device 24). The scheme provider engine 800 also instructs the CPU 200 to generate a card image identifier for each card image, associate that card image identifier with the card image in the affinity group card image storage device 530 and store the card image identifier in the identification data storage device 540.

Operation of the scheme provider server 1000 is further described with reference to the process illustrated in FIGS. 1 and 4. When the affinity group administrator 10 enters the scheme provider website at step S100 and applies for an affinity group scheme at step S102, the affinity group administrators computer is able to communicate with the scheme provider sever 1000 via the network 2000.

The affinity group administrator 10 then elects to enter the website creation facility 14. The scheme provider engine 800 generates a prompt, via the front end server 3000, for the affinity group administrator 10 to enter predetermined data such as the affinity group name and affinity group mission statement etc. The scheme provider engine 800 receives the requested data which is input by the affinity group administrator 10 and instructs the CPU 200 to store this data in the input website data storage device 310.

If the affinity group administrator 10 has elected to enter the image creation software 12, the scheme provider engine 800 hands operation over to the image compilation server 4000. The image compilation server 4000 carries out the same operations as the image compilation server 20 described above with reference to FIG. 3. Following creation of at least one image, the image compilation server 4000 hands operation back to the scheme provider engine 800.

Next the scheme provider engine 800 instructs the CPU 200 to generate an affinity group website. The CPU obtains a template affinity group website from the template website storage device 410 and retrieves the input website data from the input website storage device 310. The CPU 200 then generates the affinity group website in accordance with the instructions of the scheme provider engine 800, by inserting the input website data and any images into the appropriate areas of the template website, and saves the affinity group website in the affinity group website storage device 510.

The scheme provider engine 800 also instructs the CPU 200 to generate a website identifier for the affinity group website, associate that website identifier with the affinity group website in the affinity group website storage device 510 and store the website identifier in the identification data storage device 540.

Operation of the scheme provider server 1000 is further described with reference to the process illustrated in FIGS. 1 and 5. When the affinity group administrator 10 enters the scheme provider website at step S100 and applies for an affinity group scheme at step S102, the affinity group administrators computer is able to communicate with the scheme provider sever 1000 via the network 2000.

The affinity group administrator 10 then elects to enter the marketing material creation facility 16. The scheme provider engine 800 generates a prompt, via the front end server 3000, for the affinity group administrator 10 to enter predetermined data such as the affinity group name and affinity group mission statement etc. The scheme provider engine 800 receives the requested data which is input by the affinity group administrator 10 and instructs the CPU 200 to store this data in the input marketing material data storage device 320.

If the affinity group administrator 10 elects to enter the image creation software 12, the scheme provider engine 800 hands operation over to the image compilation server 6000. The image compilation server 6000 carries out the same operations as the image compilation server 20 described above with reference to FIG. 3. Following creation of at least one image, the image compilation server 6000 hands operation back to the scheme provider engine 800.

Next the scheme provider engine 800 instructs the CPU 200 to generate affinity group marketing material. The CPU 200 obtains template affinity group marketing material from the template marketing material storage device 420 and retrieves the input marketing material data from the input marketing material storage device 320. The CPU 200 then generates the affinity group marketing material in accordance with the instructions of the scheme provider engine 800, by inserting the input marketing material data and any images into the appropriate areas of the template marketing material, and saves the affinity group marketing material in the affinity group marketing material storage device 520.

The scheme provider engine also instructs the CPU 200 to generate a marketing material identifier for the affinity group marketing material, associate that marketing material identifier with the affinity group marketing material in the affinity group marketing material storage device 520 and store the marketing material identifier in the identification data storage device 540.

In alternative embodiments hardwired circuitry may be used in place of or in combination with software instructions to implement aspects of the present invention. Thus, embodiments of the present invention are not limited to any specific combination of hardware circuitry and software.

As illustrated in FIG. 9, the scheme provider server 1000 is also connected to the card issuer server 7000 and the printer server 8000 via the network 2000. When a card, or cards, are to be printed, an unique identifier is sent to the print server 8000. The printer server 8000 is illustrated as separate server to the scheme provider server 1000 in FIG. 9. However, the printer server 8000 may form part of the scheme provider server 1000. The printer server 8000 is illustrated as separate server to the scheme provider server 1000 as the printer severer 8000 may be required to be located at a secure location, for example at the card issuers premises such that the cards are printer under high security conditions.

Following printing each affinity group card is sent to the affinity group member and activated. The member can then use the card for example to purchase goods.

Figure 10:
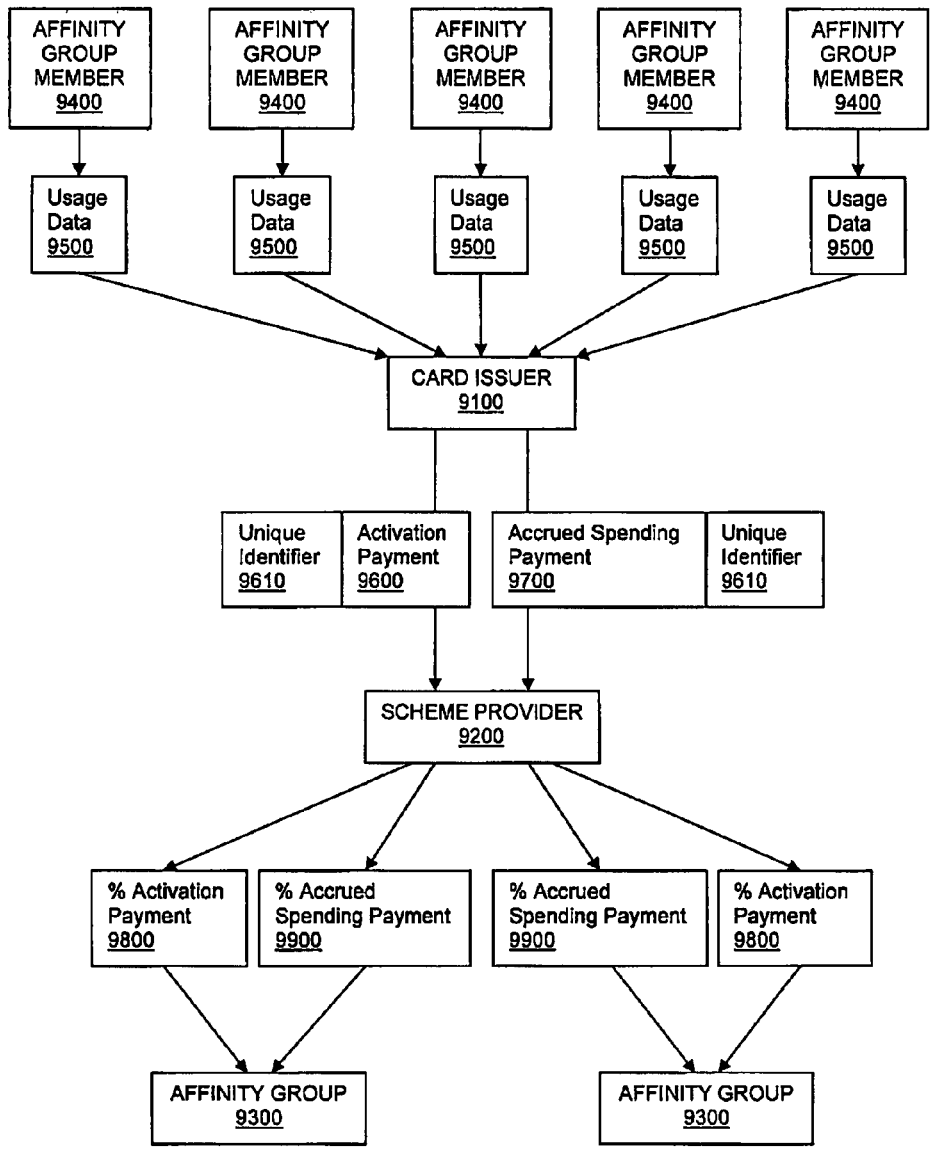
FIG. 10 illustrates a process of the present invention for apportioning payments accrued using an affinity group card.

FIG. 10 illustrates the process of distributing financial payments as a result of the affinity group scheme. The card issuer 9100 makes an activation payment 9600 to the scheme provider 9200. An activation payment 9600 is a payment made in respect of each affinity group member 9400 who has successfully applied for an affinity group card. In one embodiment, the activation payment 9600 is triggered by activation of the affinity group card by the affinity group member, for example the affinity group member may be required to telephone a specific telephone number following receipt of their affinity group card, in order to activate the card. The activation payment 9600 is in respect of each affinity group member and is a one-off payment.

In addition, the card issuer 9100 makes an accrued spending payment 9700 to the scheme provider 9200. An accrued spending payment 9700 is a payment made in respect of any spending accrued using the affinity group card by the affinity group member 9400. The card issuer 9100 receives usage data 9500 from retailers, which results directly from spending accrued by the affinity group member 9400 using the affinity group card. The usage data 9500 is used by the card issuer 9100 to compile statements which are sent to the affinity group member 9400 detailing, where, when and how much the affinity group member 9400 has spent using their affinity group card. In addition, the usage data 9500 is used by the card issuer 9100 in order to determine the total amount of spending accrued on each affinity group member 9400. A percentage of the total spending accrued by each affinity group member 9400 is then transferred as an accrued spending payment 9700 to the scheme provider 9200.

The accrued spending payment 9700, may be calculated and transferred to the scheme provider 9200 monthly, quarterly or yearly, for example. The accrued spending payments 9700 are made regularly until the affinity group member permanently stop using their affinity group card.

The scheme provider 9200 receives an activation payment 9600 and an accrued spending payment 9700 from the card issuer 9100. The scheme provider 9200 then uses the calculation device 900 illustrated in FIG. 8, to calculate a percentage of the activation payment(s) 9600 and the accrued spending payment(s) 9700. Finally, the scheme provider 9200 transfers the calculated percentage of the activation payment(s) 9800 and the calculated percentage of the accrued spending payment(s) 9900 to the affinity group 9300 to which the affinity group member 9400 belongs.

In a preferred embodiment, the activation payment 9600 and the accrued spending payment 9700 are associated with a unique identifier 9610 prior to being transferred from the card issuer 9100 to the scheme provider 9200. The unique identifier 9610 provides the scheme provider 9200 with data such as the affinity group member 9400 from which the payment results and the affinity group 9300 which the affinity group member 9400 belongs. The unique identifier may be the same unique identifier as that created at step S410 or step S508 in FIGS. 6 and 7 respectively.

Upon receipt of an activation payment 9600 or an accrued spending payment 9700, the scheme provider 9200 uses the unique identifier 9610 which is associated with the activation payment 9600 or the accrued spending payment 9700, to determine which affinity group 9300 the affinity group member 9400 belongs and then transfers the percentage activation payment 9800 or the percentage accrued spending payment 9900 to that affinity group 9300.

In one embodiment, the activation payment 9600 and the accrued spending payment 9700 may be sent in batches, for example, a batched payment may relate to at least one activation payment 9600 and at least one accrued spending payment 9700; and/or a batched payment may relate to several affinity group members of the same affinity group and/or different affinity groups. The scheme provider 9200 can then use the unique identifier 9610 in order to determine which affinity group member 9400 the payment accrued from, and consequently, the scheme provider 9200 is able to determine the percentage activation payment 9800 and/or the percentage accrued spending payment 9900 which should be transferred to each affinity group 9300.

The method and apparatus of the present invention enables an affinity group scheme to be offered to a wide range of affinity groups, as the card issuer is not required to spend large amounts of money and time offering an affinity group scheme to multiple individual affinity groups and then helping each affinity group design an affinity group card, an affinity group website and affinity group marketing material.

Therefore, the card issuer is able to appeal to a much larger range of affinity groups and the affinity group scheme is not limited to only large affinity groups enabling the affinity group scheme to be applied to previously inaccessible affinity groups. The card issuer does not need to negotiate with multiple affinity groups, a "one size fits all" partnership can be entered into with the scheme provider and many different affinity groups can then join the service without need for the card issuer to adjust ifs offering in anyway.

Furthermore, small affinity groups very often contain people who have stronger ties to the affinity group than are found for larger groups (i.e. the affinity is stronger). This can translate to higher response rates and greater card usage.

Moreover, online sign-up for affinity groups means that a wide array of potential tools can be delivered to all participants. This diversity allows the affinity group to tailor it's marketing campaign to the strengths of the organization. This also means that large affinity groups that have a profile that does not fit the highly prescriptive requirements of conventional affinity group schemes can develop a campaign that plays to their strengths.

The present application discusses the use of affinity group financial cards. However, any financial account access means or transaction card means may be utilised by the affinity group scheme, such as debit cards, credit cards, store cards, gift voucher cards and telephone cards. In addition, affinity group cheque books could also be created using the affinity group scheme of the present application.

The affinity group scheme of the present invention combines technical features which together enable the system to run faster, reduce unnecessary transactions, and facilitate connectivity which would otherwise not be feasible, albeit ultimately for the purpose of an affinity group scheme.

Those skilled in the art will appreciate that while the foregoing has described what is considered to be the best mode and, where appropriate, other modes of performing the invention, the invention should not be limited to the specific configurations and methods disclosed in this description of the preferred embodiment. Those skilled in the art will recognise that the invention has a broad range of applications in many different types of affinity groups and financial account access means, and that the embodiments may take a wide range of modifications without departing from the inventive concept as defined in the appended claims.

The invention claimed is:

1. A method of producing an affinity group transaction means, the method comprising:
   displaying affinity group images;
   enabling only members of the affinity group to select one of the affinity group images; and
   applying the selected affinity group image to a transaction means.

2. A method of operating a computer system for producing an affinity group transaction means, the method comprising:
   displaying at a user interface affinity group images;
   providing an internet communications link coupling the user interface to an image processor;
   enabling only members of the affinity group to select one of the affinity group images; and
   causing the image processor to apply the selected affinity group image to a transaction means.

3. A method according to claim 1, further comprising:
   printing the transaction means having the selected affinity group image.

4. A method according to claim 1, further comprising:
   a storage means for storing the affinity group images.

5. A method according to claim 1, further comprising:
   associating an identifier to the selected affinity group image.

6. A method according to claim 5, further comprising:
   storing the selected affinity group image and the associated identifier in a storage means.

7. A method according to claim 6, wherein the identifier comprises an affinity group image identifier and an affinity group member identifier.

8. A method according to claim 1, wherein an affinity group is a group comprising at least one member.

9. A method according to claim 1, further comprising:
   enabling a member of the affinity group to upload an image from their computer;
   processing the uploaded image by applying received manipulation instructions to the uploaded image to produce a personalised affinity group image; and
   applying the uploaded personalised image to the transaction means.

10. A method of printing a transaction means, the method comprising:
    receiving user data from a processor;
    receiving user image selection data from a processor;
    printing a transaction means having the user data and the user image, wherein the user image selection data is identification data; and
    requesting the user selected image from a storage means in accordance with the identification data.

11. A method of applying for an affinity group transaction means, the method comprising:
    applying for an affinity group transaction means;

selecting, by one or more processors, an affinity group image from affinity group images for application to the affinity group transaction means; and applying the selected affinity group image to the affinity group transaction means.

12. A method of applying for an affinity group transaction means, the method comprising:

selecting, by one or more processors, an affinity group image from affinity group images for application to an affinity group transaction means; and applying for the affinity group transaction means based on the selected affinity group image.

13. A method according to claim 11 or 12, further comprising:

printing the transaction means having the selected predetermined affinity group image thereon.

14. A method according to claim 11 or 12, further comprising:

associating an image identifier to the affinity group image; and storing the image identifier and the affinity group image in storage means.

15. A method according to claim 14, further comprising:

requesting the selected affinity group image from the storage means based on the image identifier; and printing the transaction means having the selected affinity group image thereon.

16. A method according to claim 11 or 12, further comprising:

uploading an image from a personal computer; and manipulating the uploaded image, wherein the manipulated uploaded image is selected for application to the affinity group transaction means.

17. A method according to claim 16, wherein the manipulated uploaded image also comprises an affinity group logo.

18. A method according to claim 11 or 12, further comprising:

associating a user identifier to the selected predetermined affinity group image; and storing the user identifier in a storage means.

19. A method of printing a transaction means, the method comprising:

receiving a print request comprising an image identifier and a user identifier;

accessing a first storage means to retrieve image data associated with the image identifier;

accessing a second storage means to retrieve user data associated with the user identifier; and printing the transaction means comprising the retrieved user data and the retrieved image data.

20. A method according to claim 19, wherein the print request comprises a plurality of print requests, each print request comprising an image identifier and a user identifier.

21. A computer system for creating an affinity group image for application to an affinity group transaction means, the computer system comprising:

an image processor;

a user interface for displaying at least one image;

an internet communications link coupling the user interface to the image processor said link being operable to transfer instructions to manipulate an image selected from the at least one image between the user interface and the image processor; and means for causing the image processor to apply the received manipulation instructions to the selected image to produce an affinity group image, for saving in storage means the affinity group image for selection by a member of the affinity group, and for applying the selected affinity group image to the affinity group transaction means.

* * * * *